SUPERCONDUCTIVE DATA STORAGE AND TRANSMISSION APPARATUS

Filed Nov. 16, 1964

INVENTOR.
KENDAL T. ROGERS
BY
Wm J Nolan
ATTORNEY

United States Patent Office 3,399,396
Patented Aug. 27, 1968

3,399,396
SUPERCONDUCTIVE DATA STORAGE AND TRANSMISSION APPARATUS

Kendal T. Rogers, Mountain View, Calif., assignor to Varian Associates, Palo Alto, Calif., a corporation of California Filed Nov. 16, 1964, Ser. No. 411,394
8 Claims. (Cl. 340—173.1)

ABSTRACT OF THE DISCLOSURE

A data signal processing device, the basic element of which comprises a superconducting body bounded by laminate guides or "guard rails." A combination of this basic element with suitable signal induction means enables the storage and transmission of information in the form of magnetic flux "patches." By magnetically coupling a plurality of these signal processing elements into a predetermined configuration, data may be stored, transferred or regenerated.

This invention relates to a novel signal processing means and in particular to a novel superconducting structure that may be employed for signal storage, transfer, or generation.

The present trend in the field of information storage and handling is towards extreme miniaturization of logic networks. Presently known data handlers, such as computers, utilize magnetic cores for memory elements or bits, by way of example. Thin films, electroluminscent-photoconductive light amplifiers, transfluxors and other ferromagnetic structures have been suggested for use with data processing systems. Generally, each type is characterized by inherent limitations which tend to restrict the versatility and operation of systems wherein such elements are embodied. Thus, new approaches to data processing structures are constantly being sought.

An object of this invention is to provide a novel and improved means for storing and processing data.

Another object of this invention is to provide a miniaturized superconducting element that may be used for an information handling device.

Another object is to provide novel assemblies of superconducting elements that are capable of serving as data storage and transfer systems.

According to this invention, a data signal processing device comprises a superconducting body bounded by guides or guard rails, which combination enables storing and transporting information in the form of magnetic flux. The magnetic flux may be urged along the superconducting body between the guard rails by current driving means. By magnetically coupling a plurality of the signal processing devices in a predetermined configuration, data derived from pulse signals for example, may be processed for storage, or signal transfer, or further pulse generation, inter alia.

The invention will be described in greater detail with reference to the drawing in which.

Figures 1, 2, 3, 4:
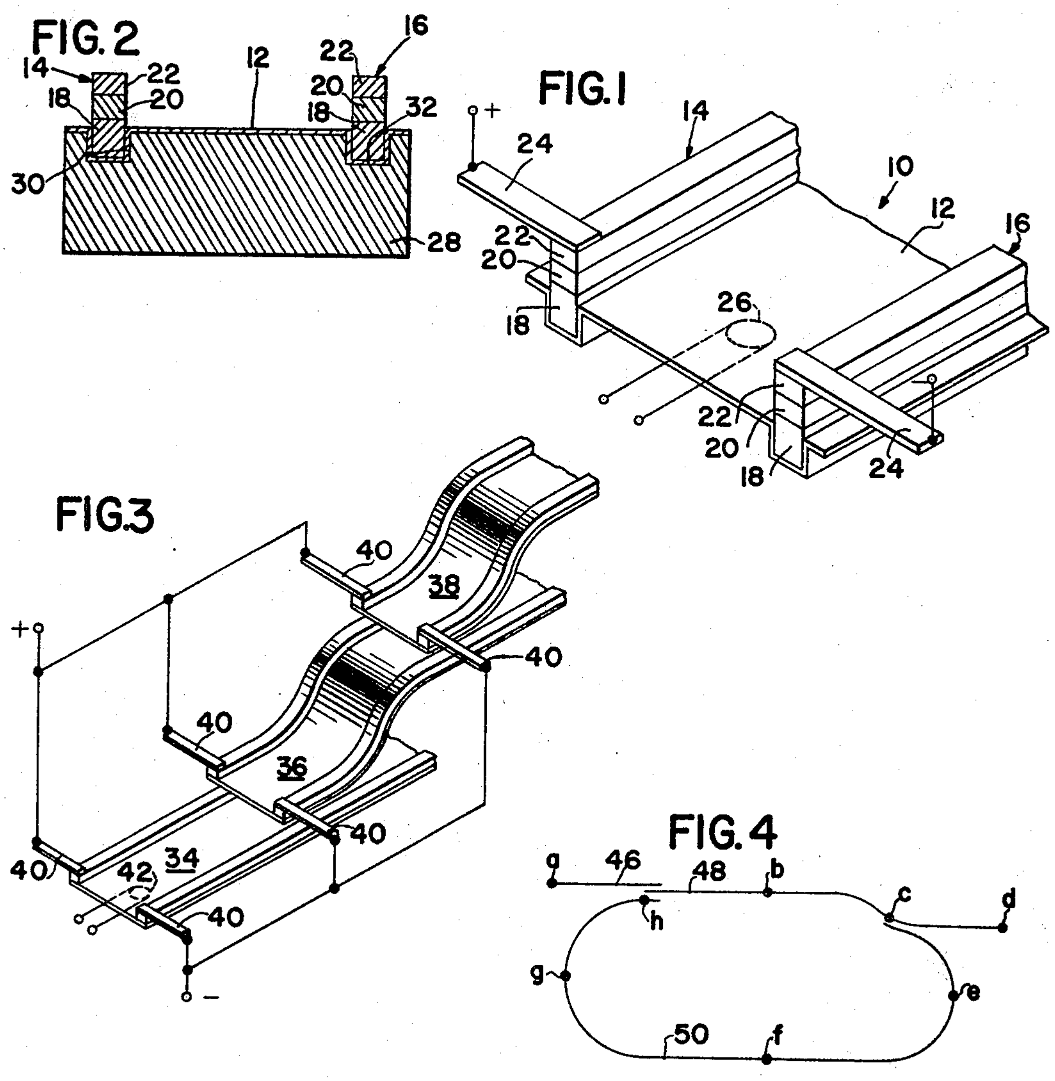
FIG. 1 is an isometric view of a storage element, in accordance with this invention.
FIG. 2 is a cross-sectional view of the inventive storage element in the process of manufacture.
FIG. 3 is an isometric view of an assembly of elements, according to this invention.
FIGS. 4 and 5 are schematic logic representations of configurations that may be utilized in accordance with this invention.

Referring to FIGS. 1 and 2, a signal processing element 10 comprises a thin layer or film of superconducting tin (Sn) material 12, which may be .010 inch in thickness and .030 inch wide, by way of example. These dimensions may be much smaller in the ultimate of miniaturization in actual applications. A pair of guides or guard rails 14 and 16, respectively, are formed at opposing edges of the surface of the tin layer 12. Each guard rail 14 and 16 is fabricated as a sandwich structure by superposing strips of lead 18, copper 20 and lead 22, respectively. The lead (Ph) and tin (Sn) are type I superconducting materials, which are preferably used in the embodiment of this invention; whereas the copper (Cu) is nonsuperconductive or normal. A metal nonsuperconductive electrode 24 is attached to the outer lead strip 22 of each guard rail 14 and 16, to provide means for supplying power via D.C. current to the element 10. Means for applying pulses, which may be data pulses, to the structure is supplied by a coil 26 supported adjacent to the tin layer 12. During operation, the element 10, in combination with other similar elements, is subjected to cryogenic temperatures, less than 4° Kelvin for example, whereby the tin and lead portions of the element become superconducting.

During the manufacture of an element in accordance with this invention, a layer of tin is placed across a machined support 28 of aluminum, for example (shown in FIG. 2), which has a pair of spaced longitudinal channels or grooves 30 and 32. The width of the tin layer is substantially greater than that of the support structure 28, and the grooves 30 and 32 are about .020 inch square by way of example. A metal rectangular bar of about the same length, but of less width than the grooves 30 and 32 is used to press the flexible tin layer into the grooves, whereby the tin is contiguous with the walls of the grooves. This metal bar consists of layers of lead 18, copper 20 and lead 22 as described above, which was previously prepared by joining three strips of the metals by standard soldering techniques. The whole structure is then heated above the lead-tin eutectic temperature of about 180° C. By this process good electrical contact is assured between the guard rail structures 14 and 16 and the tin layer. Contact electrodes 24 are soldered to the guard rails 14 and 16, with electrical leads extending therefrom. The assembly structure may be removed from the support 28, and an electrical coil 26 is positioned adjacent to the lower surface of the tin layer 12 by means of an insulating clamp (not shown) that is secured to the guard rails, or other conventional means.

In FIG. 3, an assembly of storage elements 34, 36 and 38 are disposed in magnetically coupled relation in a low temperature environment. It is noted that the elements 36 and 38 are undulated in this particular embodiment, and since the elements are flexible, various geometries and configurations are possible. Each element is coupled through electrodes 40 to a source of D.C. current. The prime element 34 is substantially flat, and includes a coil means 42 for introducing pulses to the element 34. When a signal or pulse is fed to the coil 42 during operation, the current through the coil produces a magnetic field that encompasses an adjacent portion of the superconducting tin layer of the element 34. The field, which may be less than 100 gauss, drive the tin material into a normal condition. As a result, an area of magnetic flux or a flux patch is formed in the prime element 34, representing the presence of information.

To move the flux patch from element 34 to the element 36 to the element 38 and so on, a uniform current is applied by means of the electrodes 40 across the elements and between the guard rails. The current is made uniform by virtue of the guard rail structure which includes the normal copper metal between the superconducting lead material traversing the length of the storage element. As a result, a force is developed between the applied current and the flux in such a direction that the flux patch is driven along the element. The direction of motion of the flux patch will follow the sense of the right hand rule between the current and the magnetic field of the flux patch. The flux patch is transported at a speed approximately equal to $$\frac{\tau\rho}{B}$$

where $\tau$ is the current density in the film in amperes per meter$^2$, $\rho$ is the resistivity in the normal state of the superconductor in ohmmeters, and B is the magnetic field in Webers per meter$^2$. The derivation of the above equation assumes a highly pure tin film whereby the only losses are ohmic losses in the penertation depth around the flux patch. The values for velocity under such conditions range from $10^2$ to $10^5$ cm./sec. It should be understood that flux patches may have postive negative polarities, and that patches of equal size and opposite polarity will cancel.

In the embodiment of FIG. 3, the rear end of the track of element 34 is adjacent to, but not in contact with the front end of the track of element 36 and similarly, the end of the track of element 36 is close to, but not touching the front end of the track of element 38. As the flux reaches the rear end of the element 34 the flux is linked to the elements 36, and an identical flux patch is generated in element 36 by flux pumping. Thus, two identical flux patches are present, one in each of the elements. As the flux pach in elements 36 is driven towards the element 38, a third flux patch is developed in the third element. The energy necessary to create the additional flux patches is provided by the current supply. The law of conservation of flux is also obeyed in this flux pumping (flux is carried across an edge). In this manner, a plurality of flux patches may be produced from a single signal or pulse introduced to a prime element, made in accordance with this invention.

The inventive structure lends itself to use as a pulse generator, as illustrated by the schematic logic diagram of FIG. 4. In this embodiment, a pulse is introduced at point *a*, and is passed along the track of an element 46 in the form of a flux patch, which is coupled to a second element 48 that is disposed adjacent to the end of the element 46. The flux patch moves past a point *b* along the track of the element 48 to points *c* and *d*, from which an output signal may be taken. An elliptically shaped element 50 is magnetically coupled to the element 48, and has it current electrodes at the end adjacent to point *c* of the element 48. When a flux patch appears at point *c*, and identical flux patch is formed in the element 50, and driven past points *e, f, g*, to point *h*, which is magnetically coupled to the front portion of the element 48. A flux patch is thus developed in the element 48 and the flux is driven to *b, c* and *d*, from which pulses are taken. For each pulse passing from point *c* to *d*, a similar pulse in the form of magnetic flux is driven past *e, f*, and *g* to *h*. In the manner, a series of pulses may be derived at the output terminal *d* from a single pulse applied at the input *a* of the prime element. The pulses may be of equal amplitude and uniform spacing if the elements are constructed with enough precision (since flux is a quantized quantity). It should be noted that the loop configuration may be a closed loop formed by a single continuous element, in lieu of the separate elements employed in the above described feed back arrangement.

Figure 5:
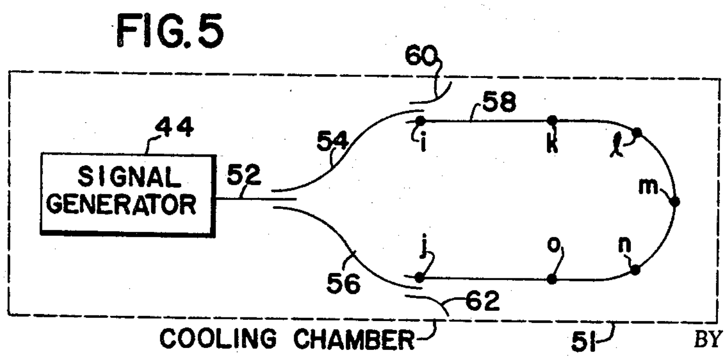

In FIG. 5, a storage assembly disposed in a thermally controlled chamber 51, in accordance with the invention, is depicted. When a pulse is applied from the signal generator 44, which may comprise the assembly of FIG. 4, to a prime element 52, a flux patch is developed and passed to a pair of opposing elements 54 and 56. Each of these elements are coupled to an oval shaped element 58, which has current electrodes for driving flux at each end *i* and *j*. With each pulse that is applied from the pulse generator 44, pulses of equal amplitude are coupled to the element 58 in opposition, and thus are cancelled at a central point *m*. However, if an opposite polarity pulse is introduced at an element 60, then such pulse will cancel one of the incoming signals from the pulse generator 44, which would otherwise appear at points *i, k, l*, and *m*. Thus, in effect, this cancellation will cause the resultant signal to appear at a point *l* in lieu of point *m*. A second cancellation pulse from element 60 will cause the resultant flux patch to appear at point *k*. On the other hand, if an opposite polarity pulse or cancelling pulse is applied at the other end of the circuit through an element 62 at point *j*, then the resultant output will appear at point *n* or *o*, depending upon the number of cancellation pulses introduced. It is understood that cancellation pulses may be applied to other elements and at other points than those specified above to effect cancellation. In this manner, flux patches may be cancelled or stored and recovered at different points in the circuit, such as between *l* and *m, k* and *l, m* and *n*, by way of example for further interpretation or utilization, such as in a binary code system or other data processing system.

The invention lends itself to extreme miniaturization and is relatively inexpensive to manufacture. The size of each unit may be reduced to fractions of inches in a transverse dimension and to micron thicknesses, in which case not only would the system still work but several benefits, such as flux quantization and conservation and low dissipation would accrue.

It is apparent that the inventive configurations described herein may be utilized for computers, logic systems, and may serve as neurons or neuristors as set forth in an article in the Proceedings of the I.R.E., October 1962, pp. 2048–2060, entitled "Neuristor—A Novel Device and System Concept," by H. D. Crane. Also, the devices taught herein may be utilized as nemistors and employed for general pattern recognition systems in optical scanning apparatus or multi-element computers. An important feature of the use of the inventive device in such systems is that a multiplicity of elements may be energized or triggered simultaneously, thereby enabling the registration and recognition of an entire image at once, in contrast to progressive scanning of elements as accomplished in presently known systems.

In addition, various other configurations, such as cylindrical, frustoconical or coaxial arrangements may be employed with the device of this invention. It should be understood that the specific materials, sizes, field values and other parameters set forth above may be varied and modified within the scope of this invention.

What is claimed is:

1. A superconductive data handling apparatus comprising: a relatively thin strip of superconducting material having means disposed along lateral edges thereof for receiving electric current transfer bars, electric current transfer bars comprising a laminate of superconducting material, non-superconducting material and superconducting material, one of said superconducting lamina being conductively received by said strip along each lateral edge, said remaining lamina remaining out of contact with said strip, means coupled to said transfer bars for providing current to said apparatus and for establishing a current flow across said strip and between said bars, and means magnetically coupled to said strip for causing a magnetic field to be induced in a portion of said strip in response to an electric signal applied thereto and in a direction so that said induced field is caused by said current flow to be displaced along said strip.

2. A signal processing element comprising: a superconducting body for storing magnetic flux, means including a sandwiched structure of superconducting material, non-superconducting material and superconducting material in that order, coupled to said body for guilding such flux along said body, means coupled to said guilding means for providing current to said element and signal applying means magnetically coupled to said element for applying electro-magnetic energy to said body to develop flux therein.

3. A signal processing element as in claim 2 wherein said superconducting material is lead and the non-superconducting material is copper.

4. A signal processing element as in claim 2 wherein the guard rails are located at opposing edges of the superconducting layer.

5. A signal processing appaaratus comprising: a plurality of superconducting elements, each element including a superconducting layer and spaced guard rails disposed thereon for guiding flux along said layer, said guard rails being comprised of a sandwiched structure of superconducting material, non-superconducting material and superconducting material in that order, one portion of each of said elements being magnetically coupled to a portion of another element, means for applying a pulse signal to at least one of said elements, and means for applying a driving current to said elements through said guard rails.

6. A signal processing apparatus as in claims 5 wherein the output of said first element is coupled to the input of said second element, and the output of said second element is coupled to the input of said first element.

7. A signal processing apparatus comprising: a plurality of magnetically coupled superconducting elements, each of said elements including a superconducting body for storing magnetic flux, means coupled to said body for guiding such flux along said body and including a sandwich structure of superconducting material, non-superconducting material and superconducting material, means for applying a pulse signal to a first of said elements, a second and a third of said elements being magnetically coupled to said first element in opposing relation, and a fourth of said elements coupled to said second and said third elements so that the pulse outputs of said second and third elements are cancelled.

8. A signal processing element as in claim 7 further including means for separately applying to said second and third elements another pulse of opposite polarity than that which is applied to the first element so that said outputs of said second and third elements may be either cancelled or stored and recovered.

References Cited

UNITED STATES PATENTS

| | | | |
|---|---|---|---|
| 3,094,628 | 6/1963 | Jiu | 340—173.1 |
| 3,201,765 | 8/1965 | Pearl | 340—173.1 |
| 3,218,482 | 11/1965 | Green | 307—88.5 |
| 3,238,504 | 3/1966 | Crane | 307—88.5 X |
| 3,311,897 | 3/1967 | Post | 340—173.1 X |

BERNARD KONICK, *Primary Examiner.*

J. F. BREIMAYER, *Assistant Examiner.*